(12) United States Patent
Zhou et al.

(10) Patent No.: US 12,192,984 B2
(45) Date of Patent: Jan. 7, 2025

(54) MULTIPLE CROSS-CARRIER SCHEDULING COMPONENT CARRIERS

(71) Applicant: QUALCOMM Incorporated, San Diego, CA (US)

(72) Inventors: Yan Zhou, San Diego, CA (US); Tao Luo, San Diego, CA (US); Konstantinos Dimou, New York, NY (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/168,748

(22) Filed: Feb. 14, 2023

(65) Prior Publication Data

US 2023/0276425 A1  Aug. 31, 2023

Related U.S. Application Data

(63) Continuation of application No. 16/904,348, filed on Jun. 17, 2020, now Pat. No. 11,582,773.

(Continued)

(51) Int. Cl.
*H04W 72/121* (2023.01)
*H04W 72/0453* (2023.01)
(Continued)

(52) U.S. Cl.
CPC ..... *H04W 72/121* (2013.01); *H04W 72/0453* (2013.01); *H04W 72/23* (2023.01);
(Continued)

(58) Field of Classification Search
CPC ........... H04W 72/042; H04W 72/0453; H04W 72/0493; H04W 72/121; H04W 76/27; H04W 80/02
See application file for complete search history.

(56) References Cited

U.S. PATENT DOCUMENTS 8,767,663 B2   7/2014  Chang et al.
9,154,275 B2  10/2015  Moon et al.
(Continued)

FOREIGN PATENT DOCUMENTS

CN   101959249 A   1/2011
CN   104919746 A   9/2015
(Continued)

OTHER PUBLICATIONS

CMCC: "Discussion on Cross-Carrier Scheduling with Different Numerologies", 3GPP Draft, 3GPP TSG RAN WG1 #97, R1-1906527, 3rd Generation Partnership Project (3GPP), Mobile Competence Centre, 650, Route Des Lucioles, F-06921, Sophia-Antipolis Cedex, France, vol. RAN WG1 No. Reno USA, May 13, 2019-May 17, 2019, May 13, 2019 (May 13, 2019), XP051727977, 5 pages, paragraph 2.

(Continued)

*Primary Examiner* — Eric Nowlin
(74) *Attorney, Agent, or Firm* — Patterson+ Sheridan, L.L.P.

(57) ABSTRACT

Certain aspects of the present disclosure are generally directed to a method for wireless communication. The method generally includes receiving a configuration of resources on a plurality of signaling entities for reception of a plurality of control messages, wherein each of the plurality of control messages schedules resources on a different signaling entity than one of the plurality of signaling entities on which the control message is to be received, and monitoring the configured resources on the plurality of signaling entities for the plurality of control messages.

22 Claims, 13 Drawing Sheets

Related U.S. Application Data

(60) Provisional application No. 62/870,991, filed on Jul. 5, 2019.

(51) Int. Cl.
*H04W 72/23* (2023.01)
*H04W 72/53* (2023.01)
*H04W 76/27* (2018.01)
*H04W 80/02* (2009.01)

(52) U.S. Cl.
CPC .......... *H04W 72/53* (2023.01); *H04W 76/27* (2018.02); *H04W 80/02* (2013.01)

(56) References Cited

U.S. PATENT DOCUMENTS

| | | | |
|---|---|---|---|
| 9,253,715 B2 | 2/2016 | Jung et al. | |
| 9,456,454 B2 | 9/2016 | Gao et al. | |
| 9,692,495 B2 * | 6/2017 | Geirhofer | H04L 1/0026 |
| 10,116,422 B2 | 10/2018 | Chen et al. | |
| 10,313,071 B2 * | 6/2019 | Lee | H04L 5/001 |
| 10,383,102 B2 | 8/2019 | Yi et al. | |
| 10,555,329 B2 | 2/2020 | Golitschek Edler Von Elbwart et al. | |
| 10,863,511 B2 | 12/2020 | Cheng | |
| 11,026,226 B2 | 6/2021 | Yang et al. | |
| 11,057,891 B2 | 7/2021 | Cheng | |
| 11,109,397 B2 | 8/2021 | Zhou et al. | |
| 11,147,094 B2 | 10/2021 | Ren et al. | |
| 11,219,023 B2 | 1/2022 | Yang et al. | |
| 11,368,967 B2 | 6/2022 | Golitschek Edler Von Elbwart et al. | |
| 11,489,638 B2 * | 11/2022 | Manolakos | H04L 1/1642 |
| 11,582,773 B2 | 2/2023 | Zhou | |
| 2012/0281667 A1 * | 11/2012 | Chang | H04L 5/0096 370/329 |
| 2012/0287878 A1 | 11/2012 | Moon et al. | |
| 2013/0064190 A1 | 3/2013 | Hariharan et al. | |
| 2014/0066054 A1 | 3/2014 | Jung et al. | |
| 2014/0126485 A1 | 5/2014 | Chen et al. | |
| 2014/0301293 A1 * | 10/2014 | Geirhofer | H04L 1/0026 370/329 |
| 2015/0092632 A1 * | 4/2015 | Park | H04L 5/0055 370/280 |
| 2016/0183262 A1 | 6/2016 | Fan et al. | |
| 2017/0294997 A1 * | 10/2017 | Lee | H04W 72/23 |
| 2018/0152954 A1 | 5/2018 | Golitschek Edler Von Elbwart et al. | |
| 2018/0270851 A1 * | 9/2018 | Bhattad | H04W 72/23 |
| 2018/0279273 A1 | 9/2018 | Yang et al. | |
| 2018/0309628 A1 * | 10/2018 | Wu | H04W 76/27 |
| 2018/0317207 A1 | 11/2018 | Liao et al. | |
| 2019/0028250 A1 | 1/2019 | Chen et al. | |
| 2019/0132793 A1 | 5/2019 | Lin | |
| 2019/0313390 A1 | 10/2019 | Cheng | |
| 2019/0313429 A1 | 10/2019 | Cheng | |
| 2019/0342905 A1 | 11/2019 | Ren et al. | |
| 2020/0008231 A1 | 1/2020 | Vilaipornsawai et al. | |
| 2020/0015229 A1 | 1/2020 | Yang et al. | |
| 2020/0128565 A1 | 4/2020 | Golitschek Edler Von Elbwart et al. | |
| 2020/0186302 A1 * | 6/2020 | Manolakos | H04L 5/0051 |
| 2020/0367230 A1 | 11/2020 | Raghavan et al. | |
| 2020/0389912 A1 | 12/2020 | Baldemair et al. | |
| 2021/0051700 A1 | 2/2021 | Liou et al. | |
| 2021/0204286 A1 | 7/2021 | Yang et al. | |
| 2021/0321400 A1 | 10/2021 | Takeda et al. | |
| 2022/0029750 A1 | 1/2022 | Matsumura et al. | |
| 2022/0061066 A1 | 2/2022 | Zhou et al. | |
| 2022/0330285 A1 * | 10/2022 | Zhou | H04W 72/1263 |

FOREIGN PATENT DOCUMENTS

| | | | | |
|---|---|---|---|---|
| CN | 104919746 B | | 4/2019 | |
| CN | 111132344 A | * | 5/2020 | H04W 24/08 |
| CN | 112586038 A | | 3/2021 | |
| CN | 113169846 A | * | 7/2021 | H04L 1/1642 |
| CN | 109845178 B | | 3/2022 | |
| CN | 114364047 A | | 4/2022 | |
| CN | 111132344 B | * | 1/2023 | H04W 24/08 |
| CN | 115997449 A | * | 4/2023 | H04L 5/001 |
| EP | 2341678 A1 | | 7/2011 | |
| EP | 2530961 A1 | | 12/2012 | |
| EP | 2597798 A2 | | 5/2013 | |
| EP | 2522112 B1 | | 6/2015 | |
| EP | 3128801 A1 | | 2/2017 | |
| EP | 3139687 A1 | | 3/2017 | |
| EP | 3200382 A2 | * | 8/2017 | H04L 5/001 |
| EP | 3128801 B1 | | 10/2019 | |
| EP | 3547596 A1 | | 10/2019 | |
| EP | 3641201 A1 | | 4/2020 | |
| EP | 3714651 A1 | | 9/2020 | |
| EP | 2915277 | | 4/2021 | |
| EP | 3547596 B1 | | 9/2021 | |
| EP | 3896893 A1 | | 10/2021 | |
| EP | 4109806 A1 | * | 12/2022 | H04L 5/001 |
| ES | 2932267 T3 | * | 1/2023 | H04L 5/001 |
| JP | 2013516820 A | | 5/2013 | |
| JP | 5766718 B2 | | 8/2015 | |
| JP | 2015181297 A | | 10/2015 | |
| JP | 2016502320 A | | 1/2016 | |
| JP | 5985009 B2 | | 9/2016 | |
| JP | 2016529815 A | | 9/2016 | |
| JP | 2018522452 A | | 8/2018 | |
| JP | 2018207509 A | | 12/2018 | |
| JP | 6517413 | | 4/2019 | |
| JP | 6704417 B2 | | 6/2020 | |
| JP | 2023541361 A | * | 10/2023 | |
| KR | 20110058666 A | | 6/2011 | |
| KR | 101670517 B1 | | 10/2016 | |
| TW | 201921981 A | | 6/2019 | |
| WO | WO-2011065704 A2 | | 6/2011 | |
| WO | WO-2011082814 A1 | | 7/2011 | |
| WO | WO-2014070761 | | 5/2014 | |
| WO | WO-2014165400 A1 | * | 10/2014 | H04B 7/0626 |
| WO | WO-2017015787 A1 | | 2/2017 | |
| WO | WO-2017026086 A1 | | 2/2017 | |
| WO | 2018203650 A1 | | 11/2018 | |
| WO | WO-2019103670 A1 | | 5/2019 | |
| WO | WO-2020117925 A1 | * | 6/2020 | H04L 1/1642 |
| WO | WO-2021128931 A1 | * | 7/2021 | H04W 24/08 |
| WO | WO-2021207416 | | 10/2021 | |

OTHER PUBLICATIONS

Co-pending U.S. Appl. No. 16/904,207, inventor Zhou; Yan, filed Jun. 17, 2020.
Co-pending U.S. Appl. No. 16/904,394, inventor Zhou; Yan, filed Jun. 17, 2020.
International Preliminary Report on Patentability—PCT/US2020/038535 The International Bureau of WIPO—Geneva, Switzerland, dated Jan. 20, 2021.
International Search Report and Written Opinion - PCT/US2020/038535—ISA/EPO—dated Sep. 7, 2020.
Mediatek Inc: "Cross-Carrier Scheduling on Different TDD Configurations", 3GPP Draft, 3GPP TSG-RAN WG1 Meeting #66bis, R1-113048, Cross Carrier_Scheduling_Diff_TDD_Config, 3rd Generation Partnership Project (3GPP), Mobile Competence Centre, 650, Route Des Lucioles, F-06921, Sophia-Antipolis Cedex, France, vol. RAN WG1, No. Zhuhai, Oct. 10, 2011-Oct. 14, 2011, Oct. 4, 2011 (Oct. 4, 2011), pp. 1-4, XP050538207 [retrieved onOct. 4, 2011] paragraph 2.
ZTE: "PDCCH Search Space for Cross-Carrier Scheduling in LTE-A", 3GPP TSG-RAN WG1 #62, 3GPP Draft; R1-104551 PDCCH Search Space for Cross-Carrier Scheduling in LTE-A, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010-Aug. 27, 2010, Aug. 17, 2010 (Aug. 17, 2010), pp. 1-9, XP050449849, [retrieved on Aug. 17, 2010] Section 2.2.

(56) References Cited

OTHER PUBLICATIONS

European Search Report—EP24158780—Search Authority—Munich—Jun. 10, 2024.
Taiwan Search Report—TW109120608—TIPO—Jun. 2, 2024.
ZTE: "PDCCH bbvvvvvvb Blind Decoding and Search Space for Carrier Aggregation of LTE-A", 3GPP TSG-RAN WG1 #61, R1-102892, 3rd Generation Partnership Project (3GPP), Mobile Competence Centre, 650, Route Des Lucioles, F-06921 Sophia-Antipolis Cedex, France, vol. RAN WG1, No. Montreal, Canada, May 5, 2010, May 4, 2010, 8 Pages, XP050420034, Paragraph 3, Figure 2.

* cited by examiner

MULTIPLE CROSS-CARRIER SCHEDULING COMPONENT CARRIERS

CROSS-REFERENCE TO RELATED APPLICATION(S)

This application is a continuation of U.S. patent application Ser. No. 16/904,348 filed Jun. 17, 2020, which claims benefit of and priority to U.S. Provisional Application No. 62/870,991 filed Jul. 5, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for resource scheduling.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects of the present disclosure are directed to a method for wireless communication. The method generally includes receiving a configuration of resources on a plurality of signaling entities for reception of a plurality of control messages, wherein each of the plurality of control messages schedules resources on a different signaling entity than one of the plurality of signaling entities on which the control message is to be received, and monitoring the configured resources on the plurality of signaling entities for the plurality of control messages.

Certain aspects of the present disclosure are directed to a method for wireless communication. The method generally includes determining a configuration of resources on a plurality of signaling entities for reception of a plurality of control messages, each of the plurality of control messages scheduling resources on a different signaling entity than one of the plurality of signaling entities on which the control message is to be received, and transmitting an indication of the configuration of the resources to a user-equipment (UE).

Certain aspects of the present disclosure are directed to an apparatus for wireless communication. The apparatus generally includes a memory; and one or more processors coupled to the memory, the one or more processors and the memory being configured to: receive a configuration of resources on a plurality of signaling entities for reception of a plurality of control messages, wherein each of the plurality of control messages schedules resources on a different signaling entity that one of the plurality of signaling entities on which the control message is to be received; and monitor the configured resources on the plurality of signaling entities for the plurality of control messages.

Certain aspects of the present disclosure are directed to an apparatus for wireless communication. The apparatus generally includes means for receiving a configuration of resources on a plurality of signaling entities for reception of a plurality of control messages, wherein each of the plurality of control messages schedules resources on a different signaling entity than one of the plurality of signaling entities on which the control message is to be received; and means for monitoring the configured resources on the plurality of signaling entities for the plurality of control messages.

Certain aspects of the present disclosure are directed to a computer readable medium having computer executable code stored thereon for wireless communication. The computer readable medium generally includes code for receiving a configuration of resources on a plurality of signaling entities for reception of a plurality of control messages, wherein each of the plurality of control messages schedules resources on a different signaling entity than one of the plurality of signaling entities on which the control message is to be received; and code for monitoring the configured resources on the plurality of signaling entities for the plurality of control messages.

Certain aspects of the present disclosure are directed to an apparatus for wireless communication. The apparatus generally includes a memory; and one or more processors coupled to the memory, the one or more processors and the memory being configured to: determine a configuration of resources on a plurality of signaling entities for reception of a plurality of control messages, each of the plurality of control messages scheduling resources on a different signaling entity than one of the plurality of signaling entities on which the control message is to be received; and transmit an indication of the configuration of the resources to a UE.

Certain aspects of the present disclosure are directed to an apparatus for wireless communication. The apparatus generally includes means for determining a configuration of resources on a plurality of signaling entities for reception of a plurality of control messages, each of the plurality of control messages scheduling resources on a different signaling entity than one of the plurality of signaling entities on which the control message is to be received; and means for transmitting an indication of the configuration of the resources to a UE.

Certain aspects of the present disclosure are directed to a computer readable medium having computer executable code stored thereon for wireless communication. The computer readable medium generally includes code for determining a configuration of resources on a plurality of signaling entities for reception of a plurality of control messages, each of the plurality of control messages scheduling resources on a different signaling entity than one of the plurality of signaling entities on which the control message is to be received; and code for transmitting an indication of the configuration of the resources to a UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
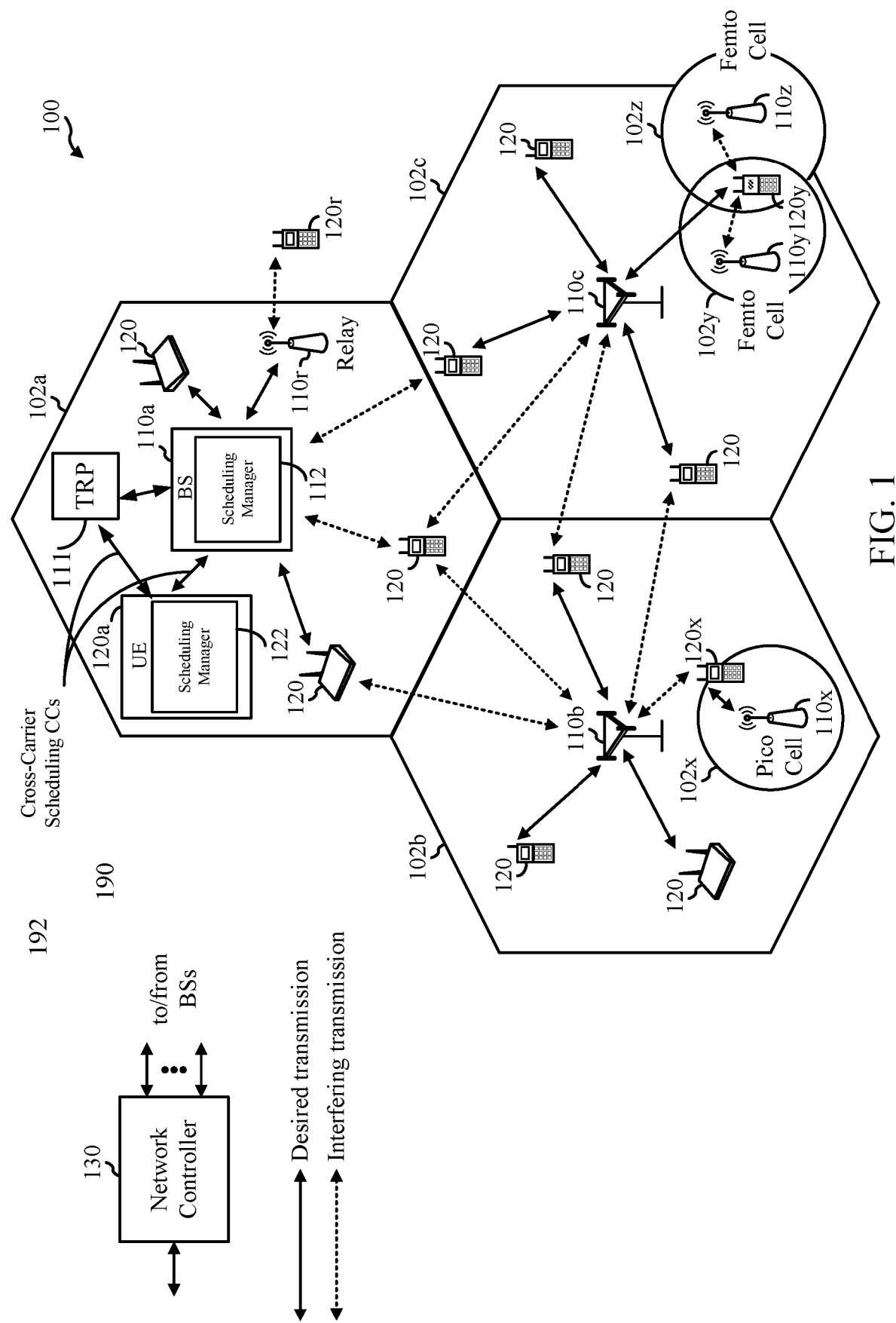
FIG. 1 is a block diagram conceptually illustrating an example telecommunications system, in accordance with certain aspects of the present disclosure.

Aspects of the present disclosure provide apparatus, methods, processing systems, and computer readable mediums for resource scheduling. For example, certain aspects are directed to techniques for configuring multiple scheduling component carriers (CCs) for cross-carrier scheduling. A scheduling CC generally refers to a CC that is used to schedule resources for transmissions on other CCs, as described in more detail herein. By scheduling multiple scheduling CCs, if decoding of one of the scheduling CCs fails, control information on another CC may still be decoded for cross-carrier scheduling. In certain aspects, one scheduling CC may be used to designate another CC as a scheduling CC. For example, a preconfigured scheduling CC may indicate resources for receiving a control message on another CC to serve as a scheduling CC. While certain aspects of the present disclosure are described with respect to CCs to facilitate understanding, the aspects of the present disclosure may be applied for any signaling entities such as frequency resources or cells. As used herein, a signaling entity refers to a CC, frequency resource, or cell.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for resource scheduling. As shown in FIG. 1, the BS 110a includes a scheduling manager 112. The scheduling manager 112 may be configured to configure multiple component carriers (CCs) for cross-carrier scheduling, in accordance with aspects of the present disclosure. For example, multiple scheduling CCs may be preconfigured via radio resource control (RRC) messaging. In certain aspects, at least two of the scheduling CCs may be associated with different transmission reception points (TRPs) or BSs. For example, BS 110 may transmit control signaling on one of the scheduling CCs, and TRP 111 may transmit control signaling on another one of the scheduling CCs. In certain aspects, the BS 110 may send information (e.g., channel measurement information) to TRP 111 to facilitate cross-carrier scheduling by TRP 111. As shown in FIG. 1, the UE 120a includes a scheduling manager 122. The scheduling manager 122 may be configured to receive a configuration of multiple component carriers for cross-carrier scheduling, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
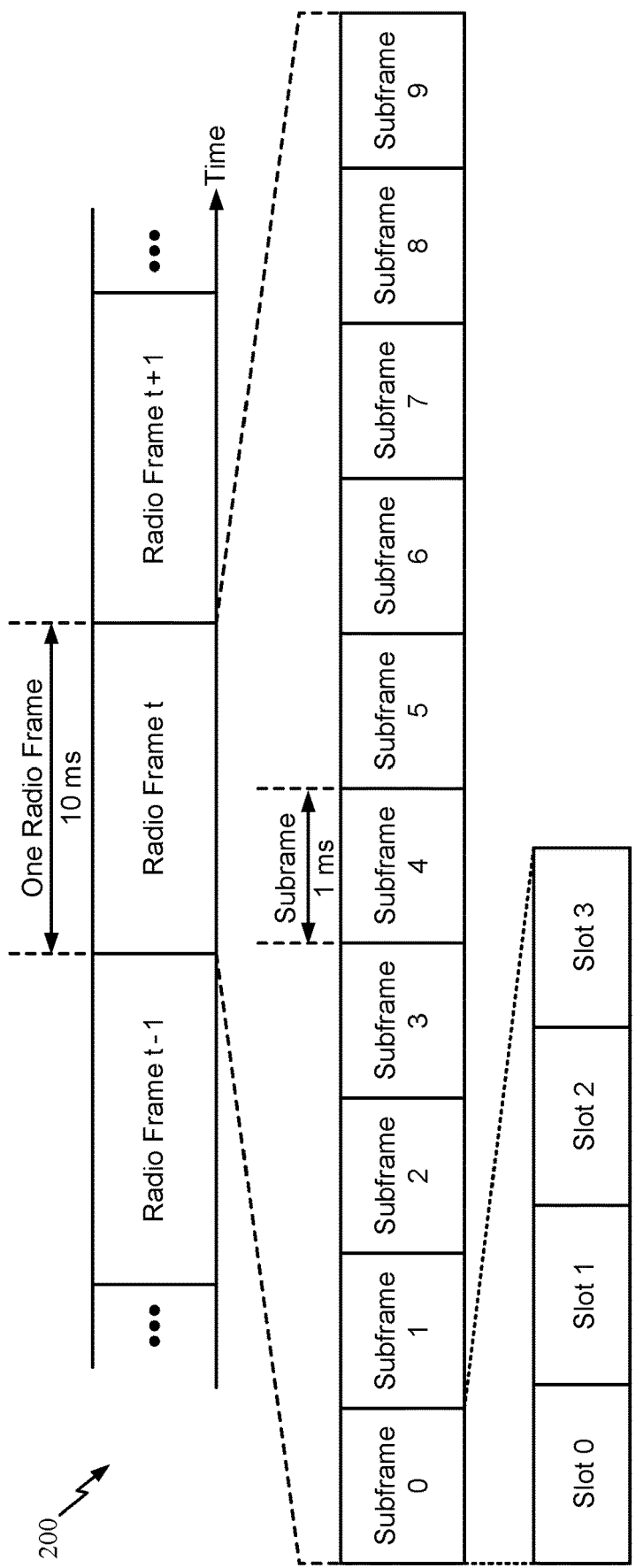
FIG. 2 is a diagram showing an example of a frame format.

FIG. 2 is a diagram showing an example of a frame format 200. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). In certain aspects, a subframe of the frame format 200 may be implemented using cross-carrier scheduling, as described in more detail herein.

Figure 3:
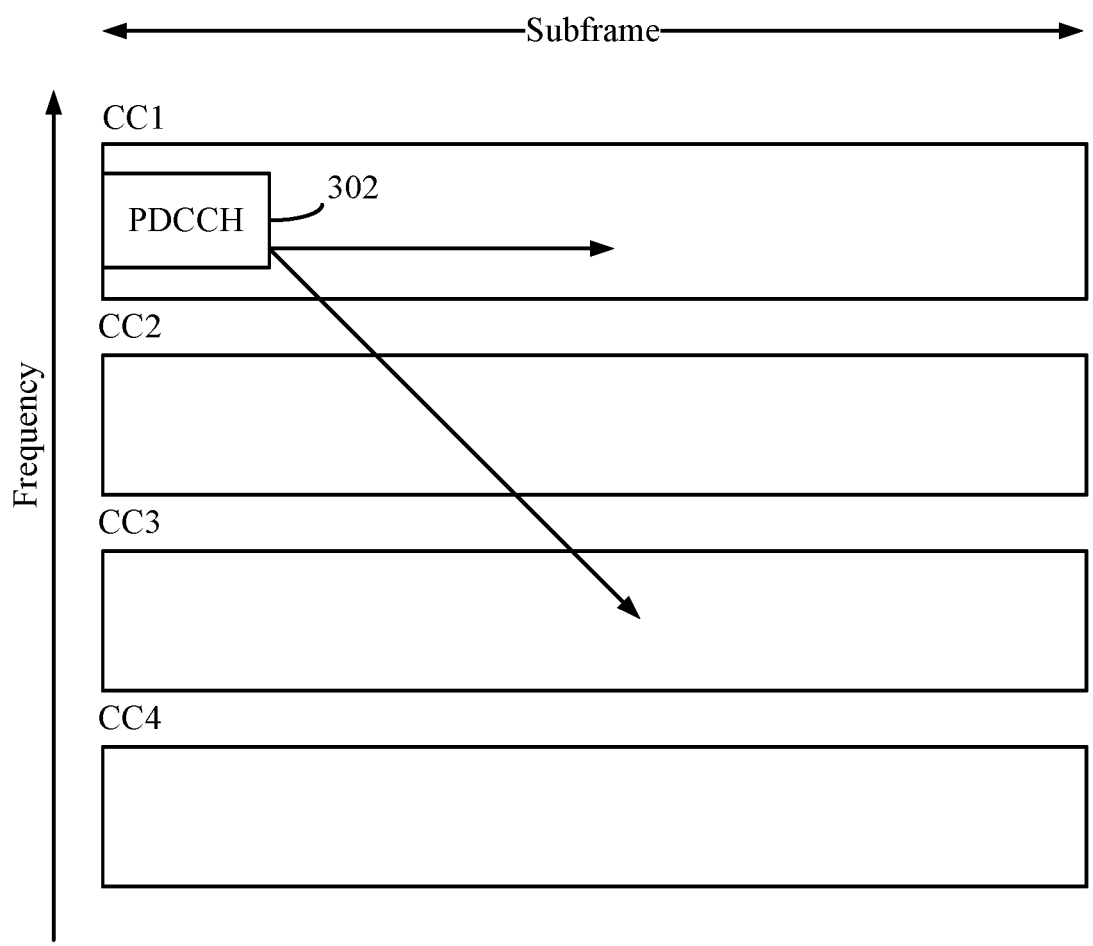
FIG. 3 illustrates example operations for cross-carrier scheduling.

FIG. 3 illustrates example operations for cross-carrier scheduling. Four CCs, referred to as CC1, CC2, CC3, and CC4, are illustrated. CC1 may include a physical downlink control channel (PDCCH) 302 that includes control information applicable to both CC1 and CC3. For instance, CC1 may schedule resources for data transmission in both CC1 and CC3. CC1 may be referred to as the scheduling CC and CC2 may be referred to as the scheduled CC. In some cases, each component carrier may be associated with a cell. While only four CCs are illustrated in FIG. 3, any number of CCs may be implemented, each of the CCs being associated with a frequency range (FR). In some cases, multiple CCs may be part of the same FR. For instance, CC3 and CC4 may be part of a first FR (FR1) and CC1 and CC2 may part of a second FR (FR2). A configuration of each FR may be different. For instance, FR1 may have a smaller bandwidth (BW) than FR2, yet have less blocking issues. FR1 may have a lower sub-carrier spacing (SCS) than FR2. For example, FR1 may have a SCS of 60, whereas FR2 may have a SCS of 120.

Example Techniques for Cross-Carrier Retransmission

As described with respect to FIG. 3, each user-equipment (UE) may be configured with a single scheduling carrier component (CC) for cross-carrier scheduling. For example, a base station (BS) 110 (e.g., gNB) may use CC1 on a second frequency resource (FR2) to schedule transmissions on CC2 and CC3. However, if the single scheduling CC fails (e.g., decoding of downlink control information (DCI) on the scheduling CC fails at the UE), the BS 110 may have to signal to the UE a new scheduling CC (e.g., via an RRC reconfiguration process), increasing latency. In certain aspects of the present disclosure, the BS 110 may signal to the UE multiple scheduling CCs, and any one of the scheduling CCs may conduct cross-carrier scheduling. For example, the BS 110 may signal (e.g., configure) two scheduling CCs as CC1 and CC2 for cross-carrier scheduling, each of which may schedule one or more transmissions on any of CC1, CC2, CC3, and CC4. For instance, if CC1 schedules a transmission on CC2, CC2 may further schedule transmissions on CC3, CC4, or back to CC1. In certain aspects, a single scheduling CC may be preconfigured, and the scheduling CC may designate another CC as a new scheduling CC, as described in more detail herein.

Figure 4:
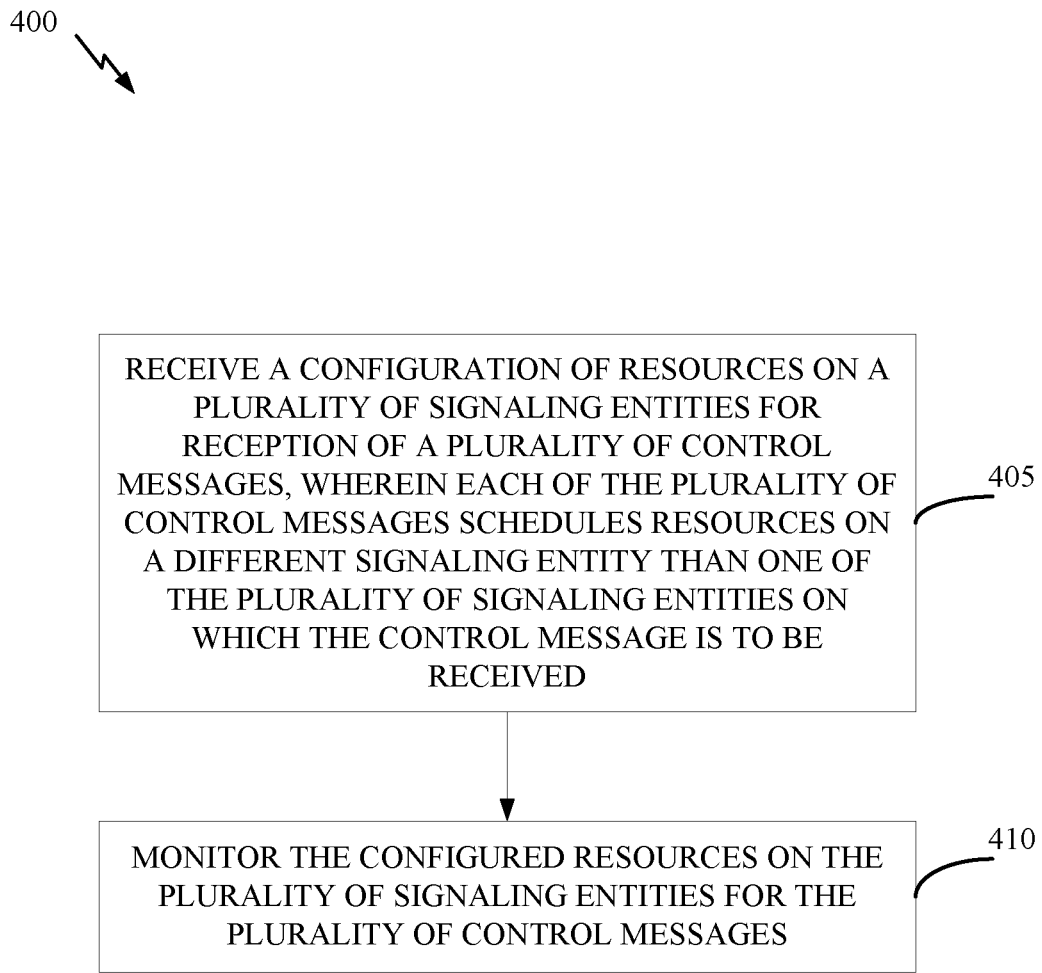
FIG. 4 is a flow diagram illustrating example operations for wireless communication by a user equipment (UE), in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100).

Figure 10:
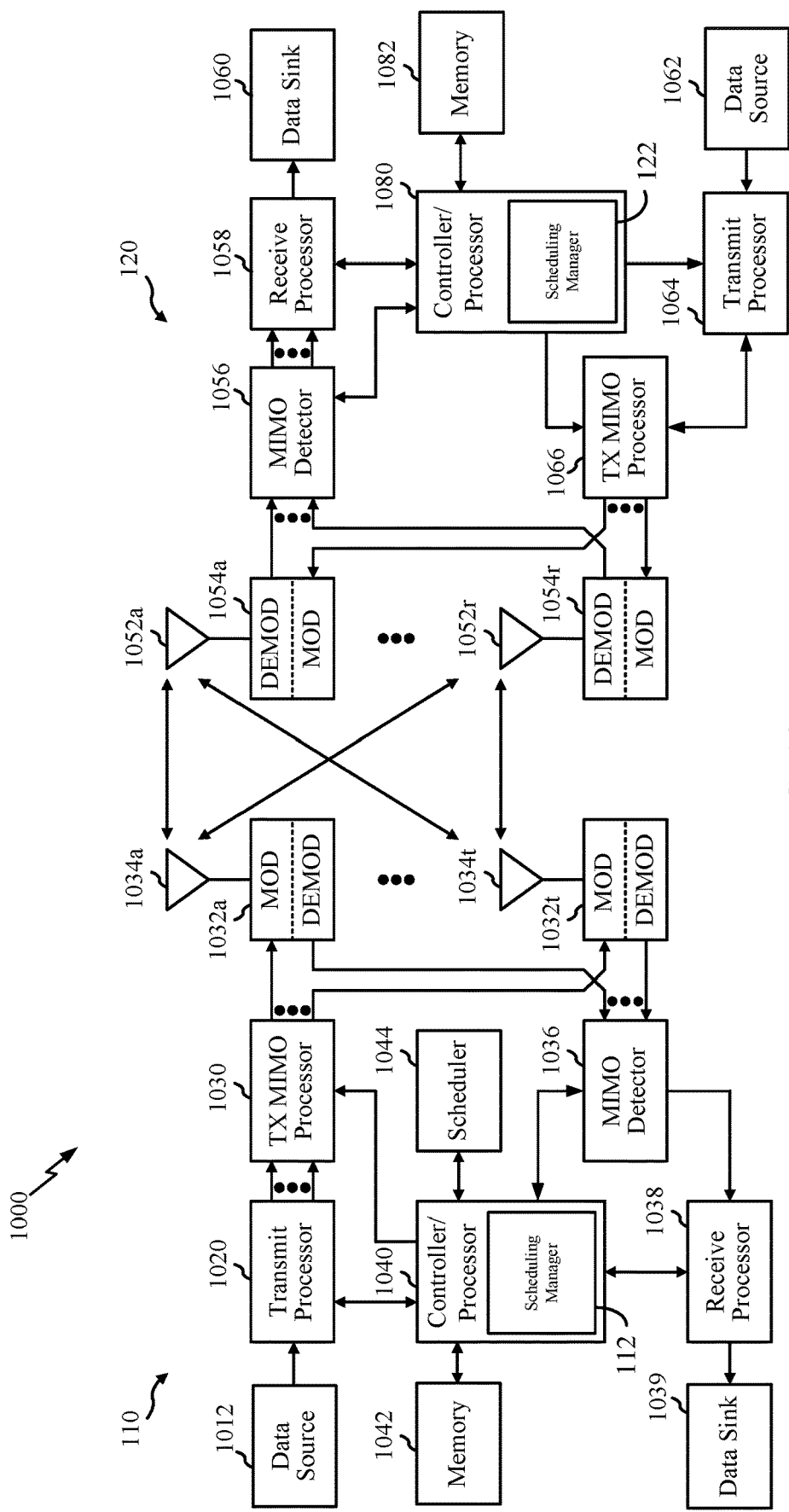
FIG. 10 is a block diagram conceptually illustrating a design of an example BS and UE, in accordance with certain aspects of the present disclosure.

Operations 400 may be implemented as software components that are executed and run on one or more processors (e.g., controller/processor 1080 of FIG. 10). Further, the transmission and reception of signals by the UE in operations 400 may be enabled, for example, by one or more antennas (e.g., antennas 1052 of FIG. 10). In certain aspects, the transmission and/or reception of signals by the UE may be implemented via a bus interface of one or more processors (e.g., controller/processor 1080) obtaining and/or outputting signals.

The operations 400 may begin at block 405, by the UE receiving a configuration of resources on a plurality of signaling entities for reception of a plurality of control messages, where each of the plurality of control messages schedules resources on a different signaling entity than one of the plurality of signaling entities on which the control message is to be received. At block 410, the UE monitors the configured resources on the plurality of signaling entities for the plurality of control messages. As used herein, a "signaling entity" refers to a frequency resource, cell, or CC.

In certain aspects, the configuration of the resources may be received via downlink control information, medium access control-control element (MAC-CE), or radio resource control (RRC) message. In some cases, a first control message of the plurality of control messages is to be received from a first transmission point, and a second control message of the plurality of control message is to be received from a second transmission point.

In some cases, the plurality of control messages may include a first control message and a second control message. The first control message, received via one of the plurality of signaling entities, may indicate the resources on another one of the plurality of signaling entities for reception of the second control message. For example, the first control message designates a switch of control for resource scheduling from the one of the plurality of signaling entities to the other one of the plurality of signaling entities.

Figure 5:
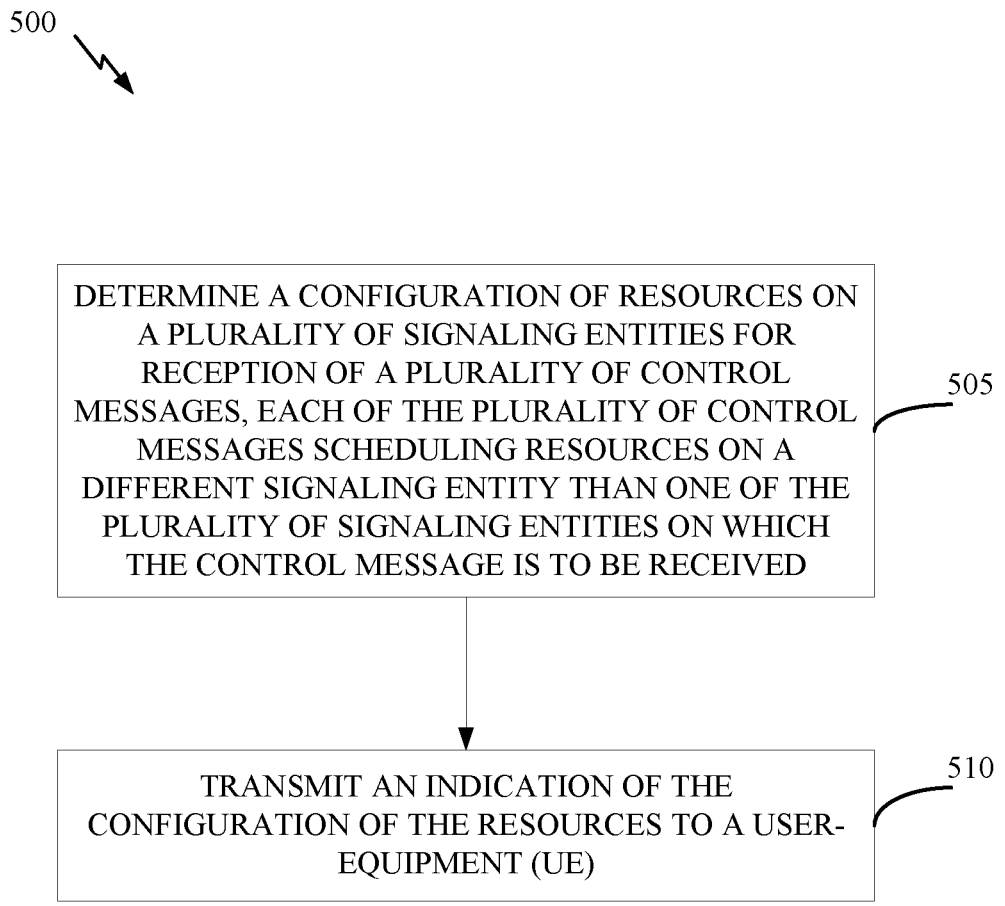
FIG. 5 is a flow diagram illustrating example operations for wireless communication by a base station (BS), in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complimentary operations by the BS to the operations 400 performed by the UE.

Operations 500 may be implemented as software components that are executed and run on one or more processors (e.g., controller/processor 1040 of FIG. 10). Further, the transmission and reception of signals by the BS in operations 500 may be enabled, for example, by one or more antennas (e.g., antennas 1034 of FIG. 13). In certain aspects, the transmission and/or reception of signals by the BS may be implemented via a bus interface of one or more processors (e.g., controller/processor 1040) obtaining and/or outputting signals.

The operations 500 may begin at block 505, by the BS determining a configuration of resources on a plurality of signaling entities for reception of a plurality of control messages, each of the plurality of control messages scheduling resources on a different signaling entity than one of the plurality of signaling entities on which the control message is to be received. At block 510, the BS may transmit an indication of the configuration of the resources to a UE.

Figure 6:
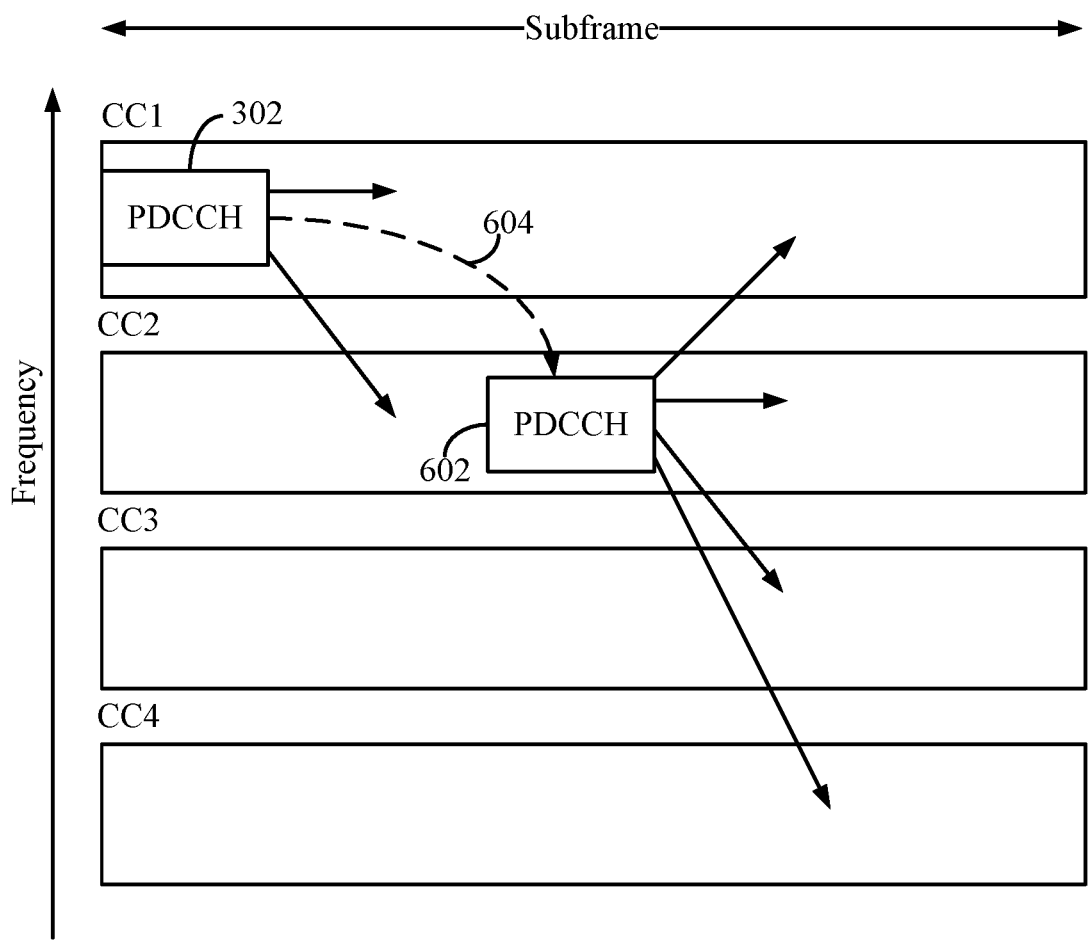
FIG. 6 illustrates multiple scheduling component carriers (CCs), in accordance with certain aspects of the present disclosure.

FIG. 6 illustrates multiple scheduling CCs, in accordance with certain aspects of the present disclosure. In certain aspects, CC1 and CC2 may both be preconfigured via DCI, MAC-CE, or a radio resource control (RRC) message, as scheduling CCs. Thus, PDCCH 302 on CC1 may be used to schedule resources on CC1 and CC2 and a PDCCH 602 on CC2 may be used to schedule resources on CC2, CC3, CC4, or even on CC1, as illustrated.

In certain aspects, instead of both CC1 and CC2 being preconfigured (e.g., via DCI, MAC-CE, or RRC message) as scheduling CCs, only one of the CCs (e.g., CC1) may be configured as a scheduling CC (e.g. a primary CC), and may designate (e.g., indicate to the UE 120) that CC2 is to serve as a scheduling CC, as represented by curve 604. For instance, physical downlink control channel (PDCCH) 302 on CC1 may schedule resources for reception of PDCCH 602 for cross-carrier scheduling on CC2. In this case, if the decoding of CC1 fails at the UE, DCI, MAC-CE, or RRC messaging may be used to configure a new CC (e.g., CC2) as the scheduling CC.

Figure 7A:
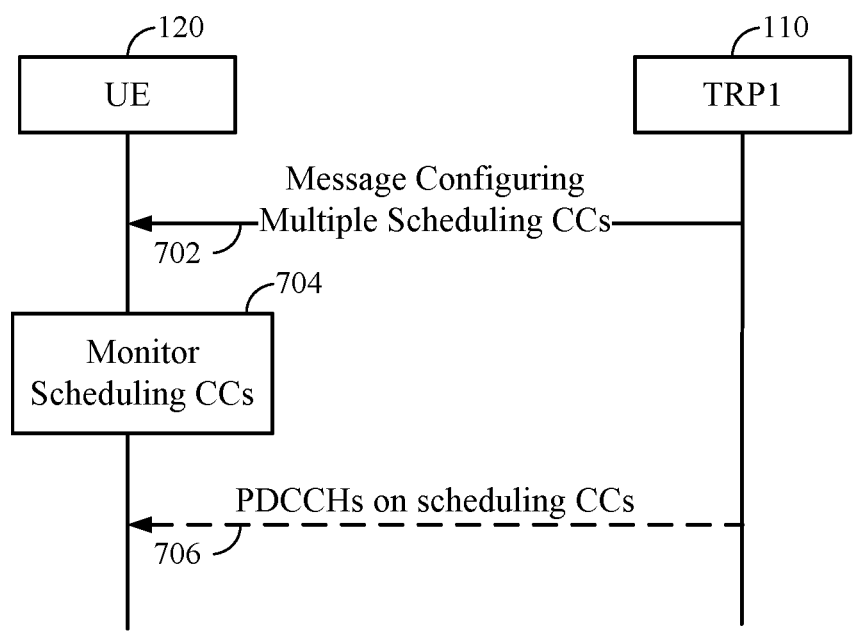
FIGS. 7A, 7B, 7C, and 7D illustrate example operations for configuring multiple scheduling CCs, in accordance with certain aspects of the present disclosure.
Figure 7B:
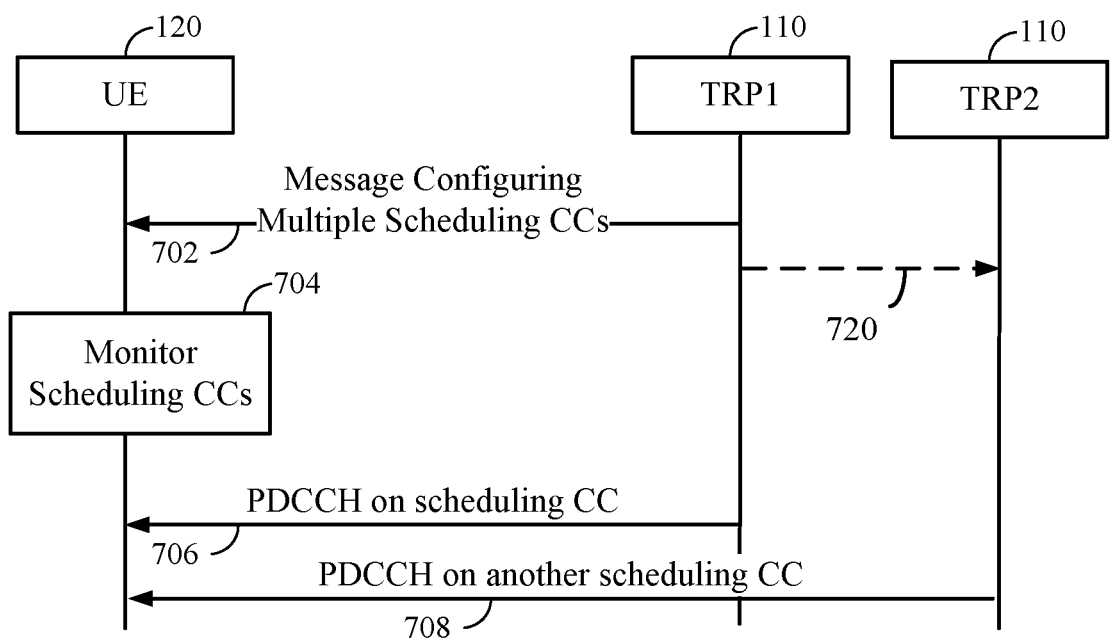

FIGS. 7A, 7B, 7C, and 7D illustrate example operations for configuring multiple scheduling CCs, in accordance with certain aspects of the present disclosure. As illustrated in FIG. 7A, a TRP (e.g., BS 110) may transmit a message (e.g., DCI, MAC-CE, or RRC message) to the UE 120 configuring multiple scheduling CCs. At block 704, the UE may monitor for PDCCHs 706 on the scheduling CCs for cross-carrier scheduling. As illustrated in FIG. 7B, the configured CCs may be associated with different TRPs. For example, a PDCCH on one of the scheduling CCs may be transmitted by TRP1 (e.g., BS 110) and a PDCCH on another one of the scheduling CCs may be transmitted by TRP2 111, as illustrated. In certain aspects, TRP1 may send a message 720 to TRP2 indicating channel measurement information associated with candidate CCs to facilitate cross-carrier scheduling, as illustrated.

Figure 7C:
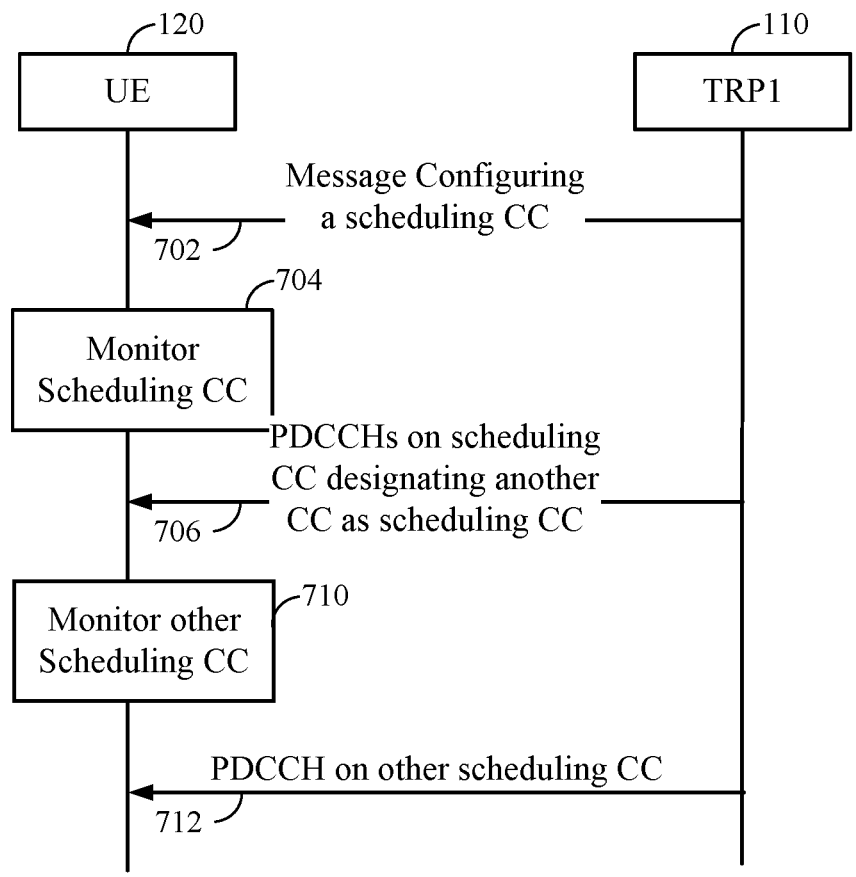
Figure 7D:
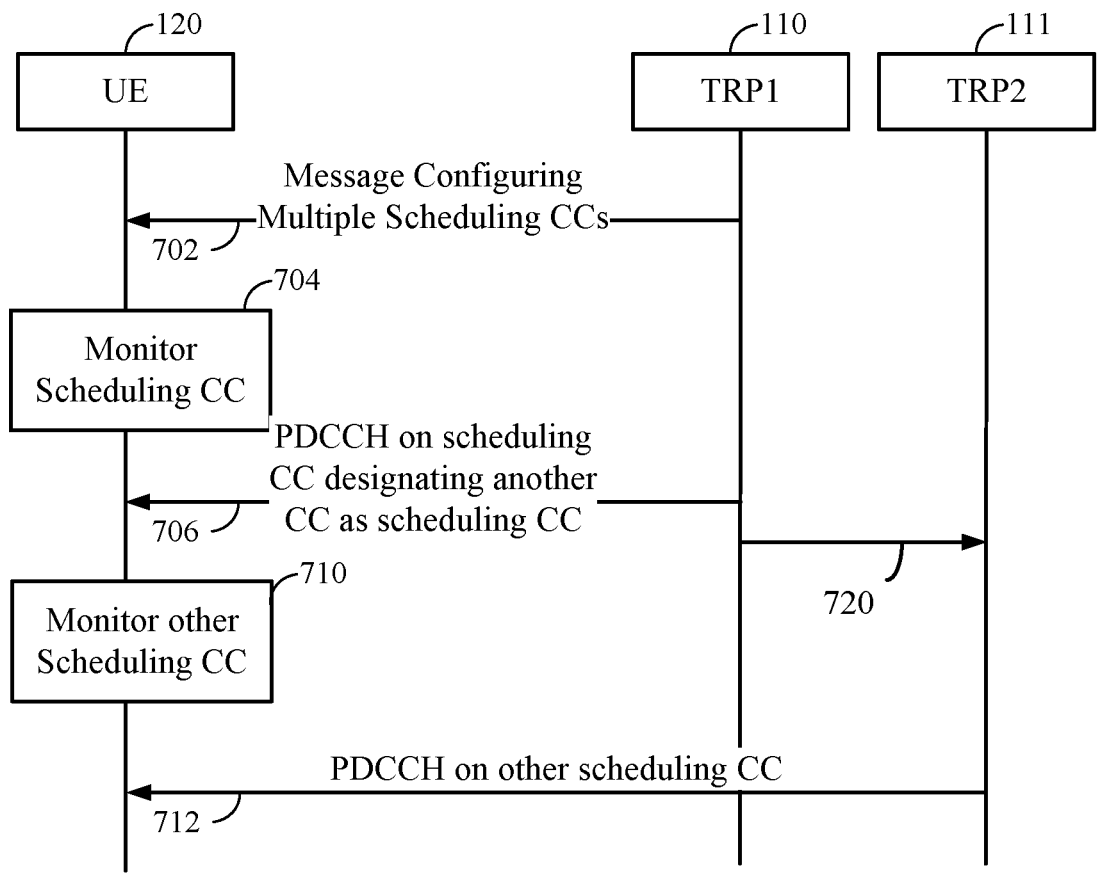

In certain aspects, one of the scheduling CCs may designate another CC as a scheduling CC. For example, as illustrated in FIG. 7C, the message 702 may configure a single scheduling CC (e.g., a primary CC). At block 704, the UE may monitor for a PDCCH 706 on the scheduling CC. The PDCCH 706 may then designate another CC to serve as a new scheduling CC. Accordingly, the UE may monitor, at block 710, for a PDCCH 712 on the new scheduling CC. As illustrated in FIG. 7D, the scheduling CCs may be associated with different TRPs. For example, the PDCCH 706 may be transmitted by TRP1 on the scheduling CC and the PDCCH 712 may be transmitted by TRP2 on the other scheduling CC. For example, TRP1 110 may be experiencing interference and as a result may switch the control for cross-carrier scheduling to TRP2. In some cases, having TRP2 perform the cross-carrier scheduling may be advantageous. For instance, TRP2 may have a lower latency. Therefore, for packets that require a lower latency, it may be advantageous to designate TRP2 for cross-carrier scheduling. In certain aspects, TRP1 may send a message 720 to TRP2 indicating channel measurement information associated with candidate CCs to facilitate cross-carrier scheduling, as illustrated.

Figure 8:
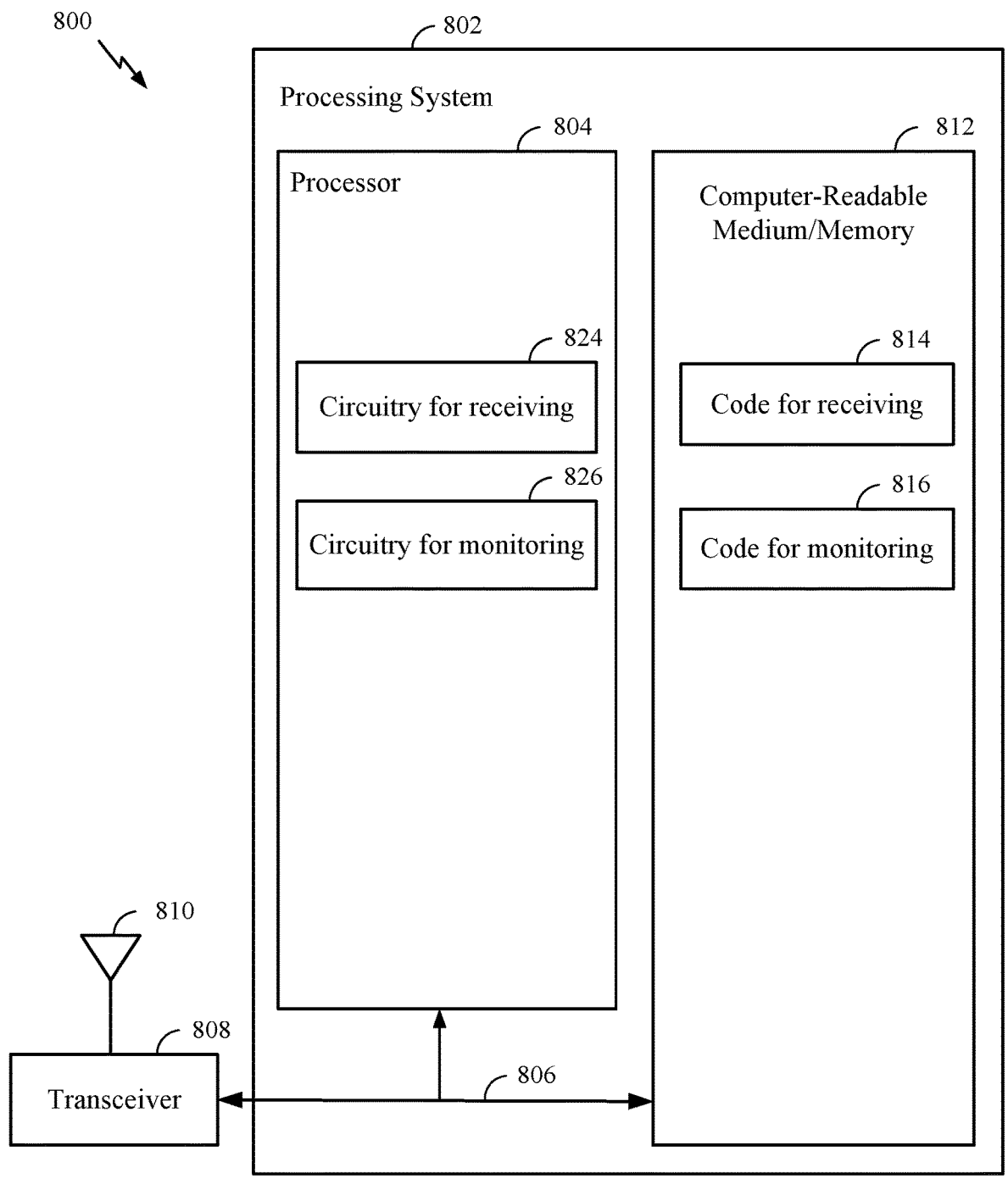
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for channel measurement. In certain aspects, computer-readable medium/memory 812 stores code 814 for receiving and code 816 for monitoring. In certain aspects, the processor 804 has circuitry configured to implement the code stored in the computer-readable medium/memory 812. The processor 804 includes circuitry 824 for receiving and circuitry 826 for monitoring.

Figure 9:
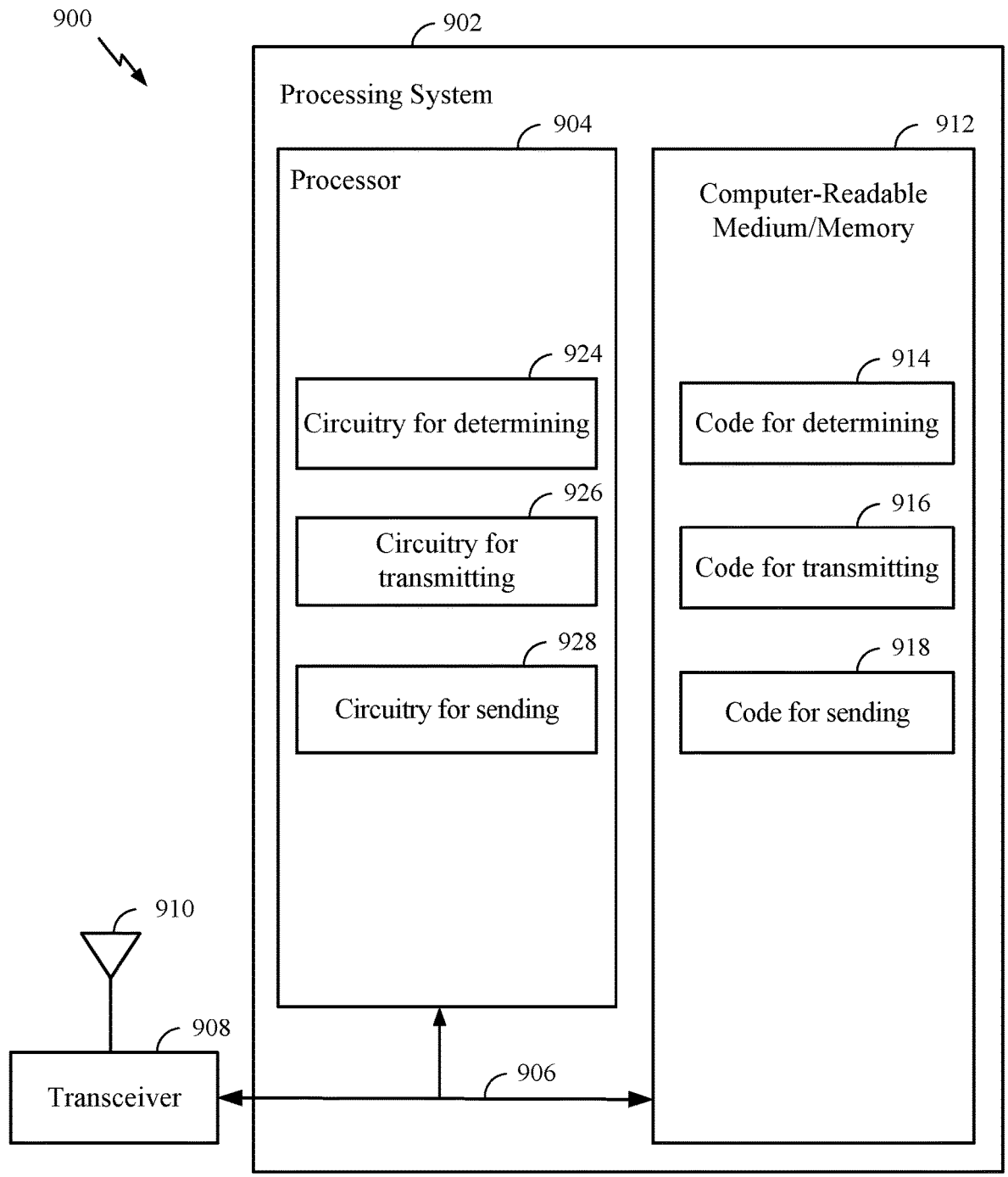
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein for cross-carrier retransmission. In certain aspects, computer-readable medium/memory 912 stores code 914 for determining; code 916 for transmitting, and code 918 for sending. In certain aspects, the processor 904 has circuitry configured to implement the code stored in the computer-readable medium/memory 912. The processor 904 includes circuitry 924 for determining; circuitry 926 for transmitting, and circuitry 928 for sending.

Example Aspects

In a first aspect, a method for wireless communication by a user-equipment (UE), comprises: receiving a configuration of resources on a plurality of signaling entities for reception of a plurality of control messages, wherein each of the plurality of control messages schedules resources on a different signaling entity than one of the plurality of signaling entities on which the control message is to be received; and monitoring the configured resources on the plurality of signaling entities for the plurality of control messages.

In a second aspect, in combination with the first aspect, each of the plurality of signaling entities and the signaling entity comprises a frequency resource.

In a third aspect, in combination with one or more of the first aspect and the second aspect, each of the plurality of signaling entities and the signaling entity comprises a component carrier (CC) or cell.

In a fourth aspect, in combination with one or more of the first aspect through the third aspect, the plurality of signaling entities comprise a first scheduling signaling entity and a second scheduling signaling entity, wherein the control message on the first scheduling signaling entity schedules resources on the second scheduling signaling entity.

In a fifth aspect, in combination with one or more of the first aspect through the fourth aspect, the configuration of the resources is received via downlink control information, medium access control-control element (MAC-CE), or radio resource control (RRC) message In a sixth aspect, in combination with one or more of the first aspect through the fifth aspect, a first control message of the plurality of control messages is to be received from a first transmission point, and a second control message of the plurality of control message is to be received from a second transmission point.

In a seventh aspect, in combination with one or more of the first aspect through the sixth aspect, the plurality of control messages comprise a first control message and a second control message, and wherein the first control message, received via one of the plurality of signaling entities, indicates the resources on another one of the plurality of signaling entities for reception of the second control message.

In an eighth aspect, in combination with the seventh aspect, the first control message designates a switch of control for resource scheduling from the one of the plurality of signaling entities to the other one of the plurality of signaling entities.

In a ninth aspect, a method for wireless communication, comprises: determining a configuration of resources on a plurality of signaling entities for reception of a plurality of control messages, each of the plurality of control messages scheduling resources on a different signaling entity than one of the plurality of signaling entities on which the control message is to be received; and transmitting an indication of the configuration of the resources to a UE.

In a tenth aspect, in combination with the ninth aspect, each of the plurality of signaling entities and the signaling entity comprises a frequency resource.

In an eleventh aspect, in combination with one or more of the ninth aspect and the tenth aspect, each of the plurality of signaling entities and the signaling entity comprises a CC or cell.

In an twelfth aspect, in combination with one or more of the ninth aspect through the eleventh aspect, wherein the plurality of signaling entities comprise a first scheduling signaling entity and a second scheduling signaling entity, wherein the control message on the first scheduling signaling entity schedules resources on the second scheduling signaling entity.

In an thirteenth aspect, in combination with one or more of the ninth aspect through the twelfth aspect, the configuration of the resources is indicated via downlink control information, MAC-CE, or RRC message.

In an fourteenth aspect, in combination with one or more of the ninth aspect through the thirteenth aspect, the method is performed by a first transmission point; the method further comprises transmitting, to the UE, a first control message of the plurality of control messages; and a second control message of the plurality of control message is to be received by the UE via one of the plurality of signaling entities associated with a second transmission point.

In a fifteenth aspect, in combination with the fourteenth aspect, the method further comprises: sending, to the second transmission point, channel measurement information to be used for the scheduling of the resources via the second control message.

In an sixteenth aspect, in combination with one or more of the ninth aspect through the fifteenth aspect, the plurality of control messages comprise a first control message and a second control message, and the method further comprises transmitting the first control message, via one of the plurality of signaling entities, indicating the resources on another one of the plurality of signaling entities for reception of the second control message.

In a seventeenth aspect, in combination with the sixteenth aspect, the first control message designates a switch of control for resource scheduling from the one of the plurality of signaling entities to the other one of the plurality of signaling entities.

In an eighteenth aspect, an apparatus for wireless communication, comprises: a memory; and one or more processors coupled to the memory, the one or more processors and the memory being configured to: receive a configuration of resources on a plurality of signaling entities for reception of a plurality of control messages, wherein each of the plurality of control messages schedules resources on a different signaling entity than one of the plurality of signaling entities on which the control message is to be received; and monitor the configured resources on the plurality of signaling entities for the plurality of control messages.

In a nineteenth aspect, in combination with the eighteenth aspect, each of the plurality of signaling entities and the signaling entity comprises a frequency resource.

In a twentieth aspect, in combination with one or more of the eighteenth aspect and the nineteenth aspect, each of the plurality of signaling entities and the signaling entity comprises a CC or cell.

In a twenty-first aspect, in combination with one or more of the eighteenth aspect through the twentieth aspect, the plurality of signaling entities comprise a first scheduling signaling entity and a second scheduling signaling entity, wherein the control message on the first scheduling signaling entity schedules resources on the second scheduling signaling entity.

In a twenty-second aspect, in combination with one or more of the eighteenth aspect through the twenty-first aspect, the configuration of the resources is received via downlink control information, MAC-CE, or RRC message.

In a twenty-third aspect, in combination with one or more of the eighteenth aspect through the twenty-second aspect, a first control message of the plurality of control messages is to be received from a first transmission point and a second control message of the plurality of control message is to be received from a second transmission point.

In a twenty-fourth aspect, in combination with one or more of the eighteenth aspect through the twenty-third aspect, the plurality of control messages comprise a first control message and a second control message, and wherein the first control message, received via one of the plurality of signaling entities, indicates the resources on another one of the plurality of signaling entities for reception of the second control message.

In a twenty-fifth aspect, in combination with the twenty-four aspect, the first control message designates a switch of control for resource scheduling from the one of the plurality of signaling entities to the other one of the plurality of signaling entities.

In a twenty-sixth aspect, an apparatus for wireless communication, comprises: a memory; and one or more processors coupled to the memory, the one or more processors and the memory being configured to: determine a configuration of resources on a plurality of signaling entities for reception of a plurality of control messages, each of the plurality of control messages scheduling resources on a different signaling entity than one of the plurality of signaling entities on which the control message is to be received; and transmit an indication of the configuration of the resources to a UE.

In a twenty-seventh aspect, in combination with the twenty-sixth aspect each of the plurality of signaling entities and the signaling entity comprises a frequency resource.

In a twenty-eighth aspect, in combination with one or more of the twenty-sixth aspect and the twenty-seventh aspect, each of the plurality of signaling entities and the signaling entity comprises a CC or cell.

In a twenty-ninth aspect, in combination with one or more of the twenty-sixth aspect through the twenty-eighth aspect, the plurality of signaling entities comprise a first scheduling signaling entity and a second scheduling signaling entity, wherein the control message on the first scheduling signaling entity schedules resources on the second scheduling signaling entity.

In a thirtieth aspect, in combination with one or more of the twenty-sixth aspect through the twenty-ninth aspect, the configuration of the resources is indicated via downlink control information, MAC-CE, or RRC message.

In a thirty-first aspect, an apparatus for wireless communication includes a processor, memory coupled with the processor, the processor and memory configured to perform a method of any one of the first aspect to the seventeenth aspect.

In a thirty-second aspect, an apparatus for wireless communication includes at least one means for performing a method of any one of the first aspect to the seventeenth aspect.

In a thirty-third aspect, a non-transitory computer-readable medium storing code for wireless communication includes a processor, memory coupled with the processor, and instructions stored in the memory and executable by the processor to cause the apparatus to perform a method of any one of the first aspect to the seventeenth aspect.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

FIG. 10 illustrates example components 1000 of BS 110a and UE 120a (e.g., in the wireless communication network 100 of FIG. 1), which may be used to implement aspects of the present disclosure.

At the BS 110a, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1020 may process (e.g., encode and symbol map) the data and control information to obtain data symbols and control symbols, respectively. The transmit processor 1020 may also generate reference symbols, such as for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a-1032t. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032a-1032t may be transmitted via the antennas 1034a-1034t, respectively.

At the UE 120a, the antennas 1052a-1052r may receive the downlink signals from the BS 110a and may provide received signals to the demodulators (DEMODs) in transceivers 1054a-1054r, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators 1054a-1054r, perform MIMO detection on the received symbols if applicable, and provide detected symbols. A receive processor 1058 may process (e.g., demodulate, deinterleave, and decode) the detected symbols, provide decoded data for the UE 120a to a data sink 1060, and provide decoded control information to a controller/processor 1080.

On the uplink, at UE 120a, a transmit processor 1064 may receive and process data (e.g., for the physical uplink shared channel (PUSCH)) from a data source 1062 and control information (e.g., for the physical uplink control channel (PUCCH) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054a-1054r (e.g., for SC-FDM, etc.), and transmitted to the BS 110a. At the BS 110a, the uplink signals from the UE 120a may be received by the antennas 1034, processed by the modulators 1032, detected by a MIMO detector 1036 if applicable, and further processed by a receive processor 1038 to obtain decoded data and control information sent by the UE 120*a*. The receive processor 1038 may provide the decoded data to a data sink 1039 and the decoded control information to the controller/processor 1040.

The memories 1042 and 1082 may store data and program codes for BS 110*a* and UE 120*a*, respectively. A scheduler 1044 may schedule UEs for data transmission on the downlink and/or uplink.

The controller/processor 1080 and/or other processors and modules at the UE 120*a* may perform or direct the execution of processes for the techniques described herein. For example, as shown in FIG. 10, the controller/processor 1040 of the BS 110*a* has a scheduling manager 112 that may be configured for cross-carrier scheduling, according to aspects described herein. As shown in FIG. 10, the controller/processor 1080 of the UE 120*a* has a scheduling manager 122 that may be configured for cross-carrier scheduling, according to aspects described herein. Although shown at the Controller/Processor, other components of the UE 120*a* and BS 110*a* may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a user-equipment (UE), comprising:
   one or more memories comprising instructions; and
   one or more processors, individually or collectively, configured to execute the instructions and cause the apparatus to:
      receive signaling indicating a plurality of cells comprising a first cell and a second cell for reception of a plurality of control messages, wherein:
         the first cell is used to cross-carrier schedule first resources on at least the second cell and the second cell is used to schedule the first resources on at least the second cell, and
         at least one of the plurality of control messages schedules the first resources on a different cell than one of the plurality of cells on which the at least one of the plurality of control messages is received; and
      monitor second resources on the plurality of cells for the plurality of control messages.

2. The apparatus of claim 1, wherein a control message of the plurality of control messages on the first cell schedules third resources on the second cell.

3. The apparatus of claim 1, wherein the signaling is received via at least one of: a downlink control information (DCI), a medium access control-control element (MAC-CE), or a radio resource control (RRC) message.

4. The apparatus of claim 1, wherein the one or more processors, individually or collectively, are further configured to execute the instructions and cause the apparatus to:
   receive a first control message of the plurality of control messages from a first transmission point; and
   receive a second control message of the plurality of control messages from a second transmission point.

5. The apparatus of claim 1, wherein the plurality of control messages comprises a first control message and a second control message, and wherein the first control message, received via the one of the plurality of cells, indicates fourth resources on another one of the plurality of cells for reception of the second control message.

6. The apparatus of claim 5, wherein the first control message designates a switch of a control for a resource scheduling from the one of the plurality of cells to the other one of the plurality of cells.

7. An apparatus for wireless communication, comprising:
   one or more memories comprising instructions; and
   one or more processors, individually or collectively, configured to execute the instructions and cause the apparatus to:
      determine a plurality of cells comprising a first cell and a second cell for reception of a plurality of control messages, wherein:
         the first cell is used to cross-carrier schedule first resources on at least the second cell and the second cell is used to schedule the first resources on at least the second cell, and
         at least one of the plurality of control messages schedules the first resources on a different cell than one of the plurality of cells on which the at least one of the plurality of control messages is received; and
      transmit signaling indicating the plurality of cells to a user-equipment (UE).

8. The apparatus of claim 7, wherein a control message of the plurality of control messages on the first cell schedules third resources on the second cell.

9. The apparatus of claim 7, wherein the signaling is transmitted via at least one of: a downlink control information (DCI), a medium access control-control element (MAC-CE), or a radio resource control (RRC) message.

10. The apparatus of claim 7, wherein:
   the apparatus is configured as a first transmission point;
   the one or more processors, individually or collectively, are further configured to execute the instructions and cause the first transmission point to transmit, to the UE, a first control message of the plurality of control messages; and a second control message of the plurality of control message is to be received by the UE via one of the plurality of cells associated with a second transmission point.

11. The apparatus of claim 10, wherein the one or more processors, individually or collectively, are further configured to execute the instructions and cause the first transmission point to:
   send, to the second transmission point, channel measurement information to be used for scheduling of fifth resources via the second control message.

12. The apparatus of claim 7, wherein:
   the plurality of control messages comprise a first control message and a second control message, and
   the one or more processors, individually or collectively, are further configured to execute the instructions and cause the apparatus to transmit the first control message, via one of the plurality of cells, indicating fourth resources on another one of the plurality of cells for reception of the second control message.

13. The apparatus of claim 12, wherein the first control message designates a switch of a control for a resource scheduling from the one of the plurality of cells to the other one of the plurality of cells.

14. A method for wireless communication by a user-equipment (UE), comprising:
receiving signaling indicating a plurality of cells comprising a first cell and a second cell for reception of a plurality of control messages, wherein:
the first cell is used to cross-carrier schedule first resources on at least the second cell and the second cell is used to schedule the first resources on at least the second cell, and
at least one of the plurality of control messages schedules the first resources on a different cell than one of the plurality of cells on which the at least one of the plurality of control messages is received; and
monitoring second resources on the plurality of cells for the plurality of control messages.

15. The method of claim 14, wherein a control message on the first cell schedules third resources on the second cell.

16. The method of claim 14, wherein the signaling is received via at least one of: a downlink control information (DCI), a medium access control-control element (MAC-CE), or a radio resource control (RRC) message.

17. The method of claim 14, further comprising:
receiving a first control message of the plurality of control messages from a first transmission point; and
receiving a second control message of the plurality of control messages from a second transmission point.

18. The method of claim 14, wherein the plurality of control messages comprises a first control message and a second control message, and wherein the first control message, received via the one of the plurality of cells, indicates fourth resources on another one of the plurality of cells for reception of the second control message.

19. The method of claim 18, wherein the first control message designates a switch of a control for a resource scheduling from the one of the plurality of cells to the other one of the plurality of cells.

20. A method for wireless communication, comprising:
determining a plurality of cells comprising a first cell and a second cell for reception of a plurality of control messages, wherein:
the first cell is used to cross-carrier schedule first resources on at least the second cell and the second cell is used to schedule the first resources on at least the second cell, and
at least one of the plurality of control messages schedules the first resources on a different cell than one of the plurality of cells on which the at least one of the plurality of control messages is received; and
transmitting signaling indicating the plurality of cells to a user-equipment (UE).

21. The method of claim 20, wherein a control message on the first cell schedules third resources on the second cell.

22. The method of claim 20, wherein the signaling is transmitted via at least one of: a downlink control information (DCI), a medium access control-control element (MAC-CE), or a radio resource control (RRC) message.

* * * * *